United States Patent [19]

Adam

[11] Patent Number: 5,639,541

[45] Date of Patent: Jun. 17, 1997

[54] OIL ABSORBENT MATERIAL WITH SUPERIOR ABRASIVE PROPERTIES

[75] Inventor: Gabriel Hamman Adam, Roswell, Ga.

[73] Assignee: Kimberly-Clark Corporation, Neenah, Wis.

[21] Appl. No.: 572,453

[22] Filed: Dec. 14, 1995

[51] Int. Cl.⁶ .................................................. B32B 27/14
[52] U.S. Cl. .......................... 428/198; 210/922; 428/212; 428/340; 428/332; 428/903; 428/920; 442/340; 442/394; 442/350
[58] Field of Search ............................ 428/198, 284, 428/286, 287, 298, 903, 212, 297, 920; 210/922, 924

[56] References Cited

U.S. PATENT DOCUMENTS

| Re. 31,885 | 5/1985 | Meitner | 252/91 |
|---|---|---|---|
| 3,338,992 | 8/1967 | Kinney | 264/24 |
| 3,343,394 | 9/1967 | Gauer et al. | 72/199 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,715,251 | 2/1973 | Prentice | 156/62.8 |
| 3,755,527 | 8/1973 | Keller et al. | 264/210 |
| 3,795,571 | 3/1974 | Prentice | 161/148 |
| 3,802,817 | 4/1974 | Matsuki et al. | 425/66 |
| 3,849,241 | 11/1974 | Butin et al. | 161/169 |
| 3,855,046 | 12/1974 | Hansen et al. | 161/150 |
| 4,041,203 | 8/1977 | Brock et al. | 428/157 |
| 4,340,563 | 7/1982 | Appel et al. | 264/518 |
| 4,609,580 | 9/1986 | Rockett et al. | 428/198 |
| 4,659,609 | 4/1987 | Lamers et al. | 428/194 |
| 4,714,647 | 12/1987 | Shipp, Jr. et al. | 428/212 |
| 4,904,521 | 2/1990 | Johnson et al. | 428/284 |
| 5,039,431 | 8/1991 | Johnson et al. | 264/113 |
| 5,108,820 | 4/1992 | Kaneko et al. | 428/198 |
| 5,108,827 | 4/1992 | Gessner | 428/219 |
| 5,213,588 | 5/1993 | Wong et al. | 51/293 |
| 5,281,463 | 1/1994 | Cotton | 428/126 |
| 5,336,552 | 8/1994 | Strack et al. | 428/224 |
| 5,382,400 | 1/1995 | Pike et al. | 264/168 |
| 5,429,854 | 7/1995 | Currie et al. | 428/138 |

FOREIGN PATENT DOCUMENTS 2267681  12/1993  United Kingdom .

OTHER PUBLICATIONS

K.D. Lawrence, et al. "An Improved Device For The Formation Of Superfine, Thermoplastic Fibers" U.S. Dept. of Commerce, U.S. Naval Research Lab., Wash., D.C. NRL Rpt. 5265, Feb. 11, 1959.

V.A. Wente, et al. "Manufacture of Superfine Organic Fibers", Naval Research Laboratory, Wash., D.C., NRL Rpt. 4364, 111437, May 25, 1954.

J.A. Manson, et al., Polymer Blends And Composites, Bicomponent and Biconstituent Fibers, Sec. 9.2, Plenum Press, pp. 273–277.

Primary Examiner—James J. Bell
Attorney, Agent, or Firm—James B. Robinson

[57] ABSTRACT

There is provided an abrasion resistant, oil absorbing fabric comprising at least one layer of fine microfibers having an average diameter of at least 10 samples of between about 1 and 7 microns bonded with at least one layer of coarse microfibers having an average diameter of at least 10 samples of between about 8 and 23 microns wherein said fabric has a basis weight between about 190 and 407 gsm and has not been secondarily bonded, except, if desired, the fabric may be pin bonded. Such a fabric has been found to be well suited to use as an oil absorbent floor mat. It has further been found that such a fabric has sufficient integrity to withstand wringing out in order to reclaim absorbed fluids.

14 Claims, 2 Drawing Sheets

OIL ABSORBENT MATERIAL WITH SUPERIOR ABRASIVE PROPERTIES

BACKGROUND OF THE INVENTION

This invention relates to the field of fabrics for use as oil absorbents, particularly as oil absorbent mats.

Oil absorbent fabrics are important in the field of oil spill cleanup as in the case of oil booms and absorbents which may be deployed on an oil slick to absorb it. Such fabrics are generally in the form of round or square cross-sectional tubes which wick oil into the structure. Oil absorbent fabrics may also be in the form of a relatively flat fabric for wiping oil coated surfaces to remove the oil from them. Such wipes are usually not abrasive as it is desired to do no damage to the surface being wiped and they also tend to be relatively light in weight. Oil absorbent fabrics may also be used as floor mats to ensure that the working area in, for example, a shop floor does not become slippery and unsafe because of oil containing products spilled in the normal course of work. Cutting oil for metal working and various automotive oils can become quite a slipping hazard for workers if not properly contained. Oil absorbent floor mats must have sufficient abrasion resistance to withstand foot traffic without pilling and tearing.

Various products have been developed for some of these applications. U.S. Pat. No. 5,281,463 to Cotton, commonly assigned, is an example of an oil boom for containing and absorbing oil spills. Many examples of oil absorbent wipes are available such as U.S. Pat. Nos. 4,904,521 and 5,039,431 to Johnson et al., and Re 31,885 to Meitner, commonly assigned, for meltblown nonwoven wipers and U.S. Pat. No. 4,659,609 to Lamers et al., also commonly assigned, for abrasive webs having meltblown and supporting layers. Also disclosed are aperture abrasive absorbent composite nonwoven wipes such as that of U.S. Pat. No. 5,429,854 to Currie et al., also commonly assigned, which shows a multilayer composite fabric having meltblown layers and supporting layers to improve the integrity of the fabric and which may be spunbonded layers.

While a number of prior efforts have tried to address the need for oil absorbent products in various configurations, there remains a need for a relatively inexpensive, abrasion resistant, oil absorbent product for use as floor mats. Such a product would desirably have the added ability to give up its oil in order for the oil to be recycled. Further, the cost of a fabric would be reduced if the need for supporting or carrier layers could be overcome.

Accordingly, it is an object of this invention to provide an abrasion resistant, oil absorbent floor mat which does not need supporting or carrier layers.

SUMMARY

The objects of the invention are provided by an abrasion resistant, oil absorbing fabric having at least one layer of fine microfibers which has an average diameter (of at least 10 samples) of between about 1 and 7 microns bonded with at least one layer of coarse microfibers having an average diameter (of at least 10 samples) of between about 8 and 23 microns. The fabric has a basis weight between about 190 and 407 gsm and need not be secondarily bonded except, if desired, the fabric may be pin bonded.

DEFINITIONS

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 (152×0.89×0.00707=1.415). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers and are generally tacky when deposited onto a collecting surface.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a pie arrangement or an "islands-in-the-sea" s arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric.

TEST METHODS

The "reciprocating abrasion test" (RAT) involves stroking a sample, usually 5.5 inch by 7 inch (140 mm by 180 mm) of fabric with a silicone rubber abrasive and then evaluating the fabric for pilling, roping and fuzzing. The horizontally reciprocating dual head abrasion tester used herein is the Model no. 8675 from United States Testing Company, Inc. of Hoboken N.J. The abradant, silicone solid rubber fiber glass reinforced material has a rubber surface hardness of 81A Durometer, a Shore A of 81 plus or minus 9 and is 36 inches (914 mm) by 4 inches (102 mm) by 0.005 inches (0.127 mm) thick and is available as catalogue no. 4050 from Flight Insulations Inc., distributors for Connecticut Hard Rubber, 925 Industrial Park Drive N.E., Marietta, Ga. 30065. Prior to testing, the sample and equipment should be conditioned to standard temperature and humidity. The abradant should be conditioned by cycling it over a scrap piece of the material to be tested about 200 times. The test sample should be free of folds, creases etc., mounted in the instrument on cork backing and cleaned of residual surface fibers with a camel hair brush. The abradant arm should be lowered and the cycling begun at a total weight of 2.6 lb. (1180 gms) with half of the weight on each of the two abradant arms.

Melt Flow Rate: The melt flow rate (MFR) is a measure of the viscosity of a polymer. The MFR is expressed as the weight of material which flows from a capillary of known dimensions under a specified load or shear rate for a measured period of time and is measured in gmms/10 minutes at a set temperature and load according to, for example, ASTM test 1238-90b.

Grab Tensile test: The grab tensile test is a measure of breaking strength and elongation or strain of a fabric when subjected to unidirectional stress. This test is known in the art and conforms to the specifications of Method 5100 of the Federal Test Methods Standard No. 191A. The results are expressed in pounds to break and percent stretch before breakage. Higher numbers indicate a stronger, more stretchable fabric. The term "load" means the maximum load or force, expressed in units of weight, required to break or rupture the specimen in a tensile test. The term "strain" or "total energy" means the total energy under a load versus elongation curve as expressed in weight-length units. The term "elongation" means the increase in length of a specimen during a tensile test. Values for grab tensile strength and grab elongation are obtained using a specified width of fabric, usually 4 inches (102 mm), clamp width and a constant rate of extension. The sample is wider than the clamp to give results representative of effective strength of fibers in the clamped width combined with additional strength contributed by adjacent fibers in the fabric. The specimen is damped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154, which have 3 inch (76 mm) long parallel clamps. This closely simulates fabric stress conditions in actual use.

DETAILED DESCRIPTION

Figure 1:
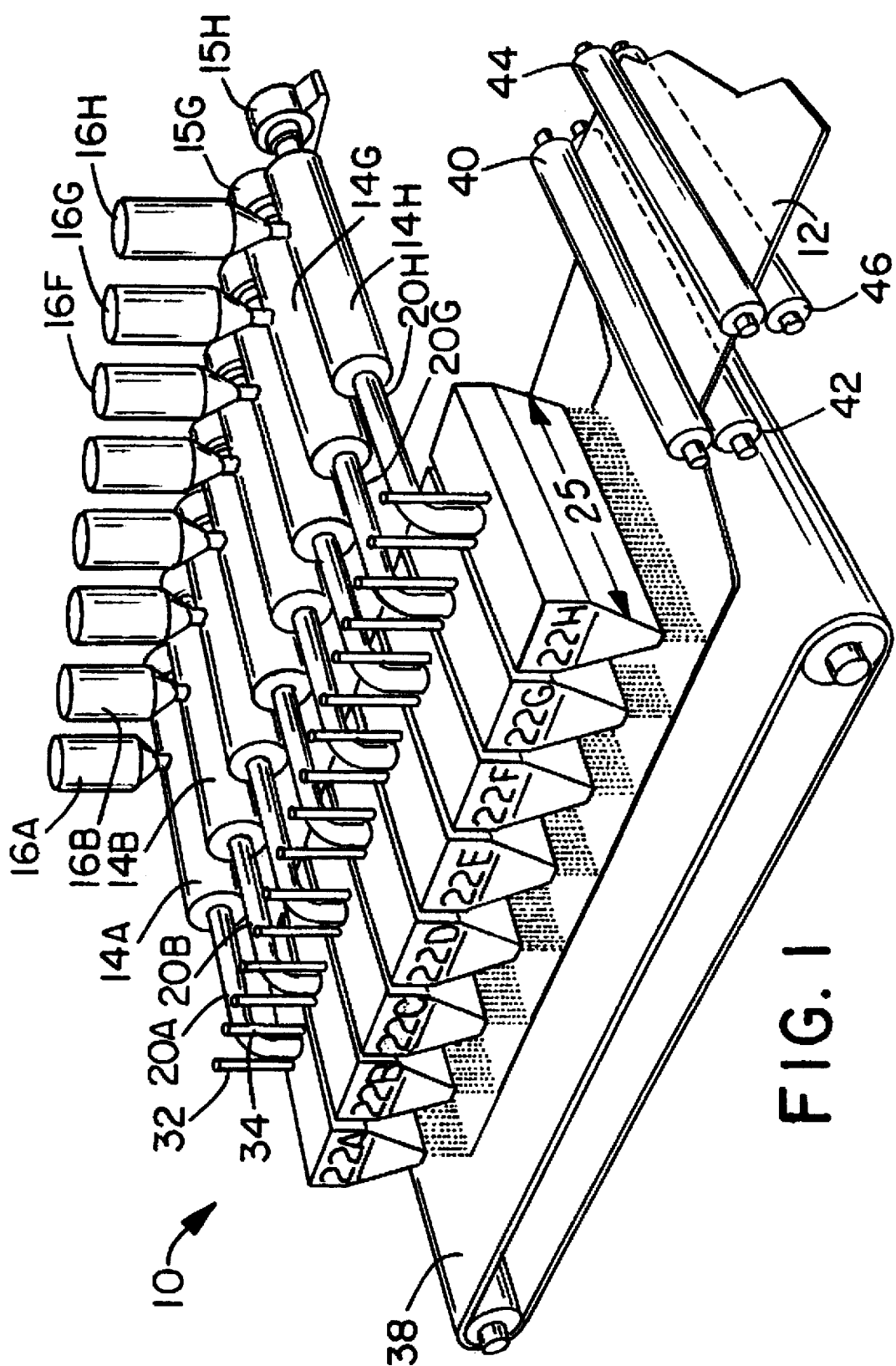

The fabric of this invention is made from microfibers preferably made by meltblowing. The fabric is made from at least two layers of microfibers which may be deposited sequentially in an in-line production process to yield a fabric having a coarse side and a fine side. Another embodiment of the fabric has a second coarse layer as the other outer side making the fine layer the interior layer. The layers of this fabric are quite different in fiber size and are positioned adjacent each other resulting in an abrupt change in fiber size through the fabric. This is in contrast, for example, to U.S. Pat. No. 4,714,647 to Shipp et al., commonly assigned, which produces a filter fabric having a gradual fiber size change through the fabric in order to increase filter life.

The coarse layer of the fabric is made of microfibers having an average diameter (of at least 10 samples) of between about 8 and 23 microns, more particularly between 10 and 19 microns, more particularly between about 12 and 17 and still more particularly about 15. The fine side of the fabric is made from microfibers having an average diameter (of at least 10 samples) of between about 1 and 7 microns, more particularly between about 3 and 5 microns and still more particularly about 4. If a second coarse layer is used, it is substantially the same as the first. The fabric of this invention generally has a weight in the range of about 30 to 70 gsm for the coarse side and 160 to 337 gsm for the fine side for a final fabric weight of from 190 to 407 gsm. The inventors have found that such a fabric surprisingly does not need any supporting layers to maintain its integrity and yet withstands abrasion extremely well. It should be noted that in service, the absorbent mat of this invention should be placed coarse side up.

The meltblowing process generally uses an extruder to supply melted thermoplastic polymer to a spinneret where the polymer is fiberized to yield fibers which may be staple length or longer. The fibers are then drawn, usually pneumatically, and deposited on a moving foraminous mat or belt to form the nonwoven fabric.

The fibers produced in the meltblown process are microfibers as defined above. The fibers may be made from any polymer which is commonly known to be processable into microfibers. In particular, polymers which are useful in the practice of this invention include polyolefins like polyethylene, polypropylene, polybutylene and blends thereof, ethylene vinyl acetate, polyvinyl chloride, polyesters, polyamides and the like. The fibers may be made from blends of any of these polymers as in a biconstituent fiber. The fibers may also be produced in a conjugate configuration. In order to minimize costs, the most likely fiber configuration is as a single polymer fiber, which however may include conventional processing aids known in the art as well as other additives such as pigments, fire retardants and wetting agents. Particular polymers which have been found useful are PF-015, available from Montell Inc. of Wilmington, Del., PD 3407G available from Exxon Chemical of Houston, Tex. and PD 3546G also from Exxon.

The manufacture of meltblown webs is discussed generally above and in the references and may also be accomplished according to the following general procedure.

Turning to FIG. 1 there is shown a web forming machine 10 for forming a melt-blown web 12 made up of a number of layers of melt-blown fibers. The machine 10 includes eight identical extruders 14A–H with corresponding hoppers 16A–H for receiving is thermoplastic resin pellets. The extruders 14A–H include internal screw conveyors which are driven by motors 15A–H. The extruders 14A–H are heated along their lengths to the melting temperature of the thermoplastic resin pellets to form a melt. The screw conveyors driven by motors 15A–H, force the thermoplastic material through the extruders into attached delivery pipes 20A–H which are connected to die heads 22A–H, each having a die width 25.

Figure 2:
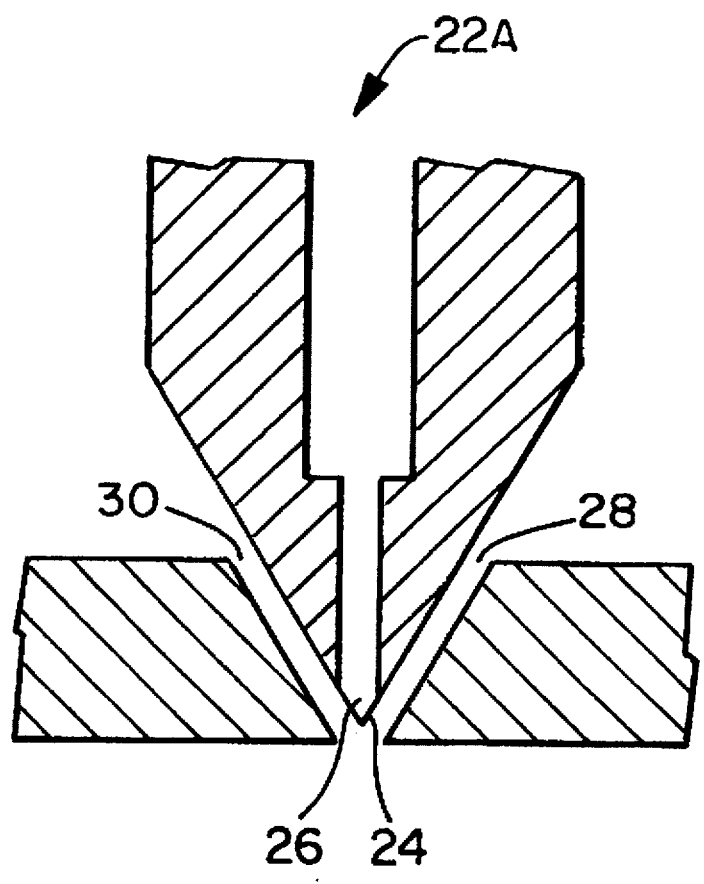

Die head 22A, for example, is shown in cross-section in FIG. 2 and comprises a die tip 24 which has a die opening or orifice 26 therein. Hot fluid, usually air, is supplied to the die tip via pipes 32 and 34 (FIG. 1) which terminate in channels 28 and 30 adjacent outlet 26 of the die tip.

As the thermoplastic polymer exits the die tip at the opening 26 for each die head, the high pressure air attenuates and breaks up the polymer stream to form fibers at each die head which fibers are deposited in layers on a moving foraminous belt 38 to form the composite layered web 12. A vacuum is drawn behind the foraminous belt 38 to draw the fibers onto the belt 38 during the process of meltblowing. Separate vacuum chambers behind the foraminous belt may be provided for each die head 22A–H. Once the fiber layers have been deposited on the moving belt 28 by the multiple die heads 22A–H, the web 12 is drawn from the belt 38 by withdrawal rolls 40 and 42 and passed to carrier rolls 44 and 46.

The foregoing description of the melt-blowing machine 10 is generally conventional and well known in the art as demonstrated by NRL Report 4364, "Manufacture of Super-Fine Organic Fibers", by V. A. Wendt, E. L. Boon, and C. D. Fluharty; NRL Report 5265, "An Improved Device for the Formation of Super-Fine Thermoplastic Fibers", by K. D. Lawrence, R. T. Lukas, and J. A. Young; and, U.S. Pat. No. 3,849,241, issued Nov. 19, 1974, to Buntin, et al.

The characteristics of the melt-blown web 12 can be adjusted by manipulation of the various process parameters used for each extruder and die head in carrying out the melt-blown process on the melt-blowing machine 10. The following parameters can be adjusted and varied for each extruder and die head in order to change the characteristics of the resulting melt-blown fiber layer:

1. Type of Polymer,
2. Polymer throughput (pounds per inch of die width per hour—PIH),
3. Polymer melt temperature,
4. Air temperature,
5. Air flow (standard cubic feet per minute, SCFM, calibrated for a 20 inch wide die head),
6. Distance from between die tip and forming belt and
7. Vacuum under forming belt.

The coarse fibers may be made by reducing the primary air temperature from the range of about 600°–640° F. (316°–338° C.) to about 420°–460° F. (216°–238° C.) and changing the formation height to about 22 inches (559 mm) for the coarse fiber bank. These changes result in the formation of larger fibers. Any other method which is effective may also be used and would be in keeping with the invention. In the examples of this invention recited herein only the first extruder bank was modified to produce coarse fibers except in the examples having a coarse layer on each side of a fine layer in which case both the first and last extruder bank was modified to produce the coarse fibers.

After the deposition of the layers, the layers may be bonded together if desired, although the in-line meltblowing process described above should yield a web of sufficient integrity that further (secondary) bonding is not necessary. If further bonding is desired, a light bond should be all that is needed for most applications. In this case, the preferred method for bonding the fabric of this invention is thermal pin bonding. Thermal pin bonding is accomplished by passing the web through rollers having widely spaced pins, as contrasted to, for example, typical thermal point bonding in which a web is calendered at a much higher density of contact points producing bonds over a large percentage of the fabric surface area. Such heavy bonding is not desired. Thermal pin bonding may use pins that have a density of about, for example, 1.34 pins/square inch and which cover a fabric bond area of only about 0.7 percent. In any case, thermal pin bonding covers an area of less than 10 percent of the fabric, more particularly less than 5 percent and still more particularly less than 1.5 percent.

The fabric of this invention may also be surface treated with various chemicals for more specialized functions. Such topical treatments and their methods of application are known in the art and include, for example, alcohol repellence treatments, anti-static treatments and the like, applied by spraying, dipping, etc. An example of such a topical treatment is the application of Zelec® antistat, available from E.I. dupont, Wilmington, Del. Chemicals such as hydrophilic chemicals, softeners, fire retardant chemicals, oil absorbing chemicals and mixtures thereof may be used on the fabric. These various chemicals may also be added to the polymer from which the invention is made prior to extrusion so that they are internal additives and not just surface treatments. Internal treatments tend to be longer lived but also tend to be more expensive.

The fabric of this invention has been found to have sufficient integrity to reclaim some of the oils absorbed by the fabric in the course of use by wringing it through conventional squeeze wringers. Wringing out a fabric is quite destructive and is generally unsuited to, for example, coform fabrics having pulp along with the polymer web as the pulp tends to disintegrate. Wringing out a pulp coform material also tends to add a lot of lint to the liquid being reclaimed.

Reciprocal abrasive testing was performed on a number of samples to determine the abrasion resistance of fabric of the invention. The samples and test results are described below.

Sample 1

This material has a fine fiber layer of 286 gsm onto which has been produced a 66 gsm layer of coarse fibers.

The fine fibers were made from a polypropylene commercially available from the Exxon Chemical Company under the trade designation PD 3745G. The fine fiber polymer throughput was 4.8 PIH at a polymer melt temperature of 600°–640° F. (315°–338° C.) and air temperature of 600°–620° F. (315°–327° C.) with air flow of 1650 SCFM and 22 inches from the die tip to the forming belt with 7–17.75 inches (178–451 mm) of water vacuum.

The coarse fibers were made from a polypropylene commercially available from the Exxon Chemical Company under the trade designation PD 3795G. The coarse fiber polymer throughput was 3.9 PIH at a polymer melt temperature of 460° F. (238° C.) and air temperature of 450° F. (232° C.) with air flow of 1000 SCFM and 22 inches from the die tip to the forming belt with 7–17.75 inches of water vacuum.

This fabric was tested according to the reciprocating abrasion test on each side. After 3 cycles the fine side had roping and was considered failed. The coarse side was tested and began to abrade at about 150 cycles. More abrasion was evident on the course side at 200 cycles and the fabric failed at 300.

This fabric was also tested for tensile strength and produced in the machine direction (MD) a peak load of 46 lbs., a MD peak energy of 38 lbs, a peak strain of 40 percent, and in the cross-direction (CD) a peak load of 48 lbs., peak energy of 58 lbs, and peak strain of 62 percent.

Sample 2

This material has a coarse layer of 66 gsm onto which was deposited a fine fiber layer of 286 gsm and then a 66 gsm layer of coarse fibers. The layers were made of the same polymers as in sample 1 and the additional coarse layer was identical to the first.

This fabric was tested according to the reciprocating abrasion test on each side. As with the coarse side of the previous sample, each side began to abrade at about 150 cycles. More abrasion was evident at 200 cycles and the fabric failed at 300.

This fabric was also tested for tensile strength and produced in the machine direction (MD) a peak load of 47 lbs., a MD peak energy of 50 lbs, a peak strain of 50 percent, and in the cross-direction (CD) a peak load of 51 lbs., peak energy of 60 lbs, and peak strain of 56 percent.

Sample 3

This material is 383 gsm meltblown fabric commercially available from the Kimberly-Clark Corporation of Dallas, Tex. as OILSORB®. It is comprised of fine fibers having an average diameter (from at least 10 samples) of about 4 microns. It is made from a polypropylene polymer commercially available as PF-015 from Montell Inc. This fabric was subjected to RAT testing and there was pilling after only 5 cycles. This fabric was also tested for tensile strength and produced in the machine direction (MD) a peak load of 40 lbs., a MD peak energy of 32 lbs, a peak strain of 38 percent, and in the cross-direction (CD) a peak load of 47 lbs., peak energy of 60 lbs, and peak strain of 62 percent.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A self-supporting abrasion resistant, oil absorbing fabric comprising at least one layer of fine microfibers having an average diameter of at least 10 samples of between about 1 and 7 microns bonded with at least one layer of coarse microfibers having an average diameter of at least 10 samples of between about 8 and 23 microns wherein said fabric has a basis weight between about 190 and 407 gsm and wherein said fabric has been lightly bonded over an area of less than 10 percent.

2. The abrasion resistant, oil absorbing fabric of claim 1 having a layer of coarse microfibers on either side of said fine microfibers.

3. The abrasion resistant, oil absorbing fabric of claim 1 which is pin bonded.

4. The abrasion resistant, oil absorbing fabric of claim 1 which has been treated with a chemical selected from the group consisting of hydrophilic chemicals, softening chemicals, fire retardant chemicals, oil absorbing chemicals, anti-static chemicals and mixtures thereof.

5. The abrasion resistant, oil absorbing fabric of claim 4 which has been topically treated with an anti-static chemical and a fire retardant chemical.

6. The abrasion resistant, oil absorbing fabric of claim 1 wherein said microfibers are comprised of a polymer selected from the group consisting of polyolefins, polyamides, polyesters, ethylene vinyl acetate and polyvinyl chloride.

7. The fabric of claim 6 wherein said polymer is polyolefin and said polyolefin is polypropylene.

8. A self-supporting abrasion resistant, oil absorbing mat comprising at least one layer of fine microfibers having an average diameter of at least 10 samples of between about 3 and 5 microns bonded with a layer of coarse microfibers having an average diameter of at least 10 samples of between about 12 and 17 microns wherein said fabric has a basis weight between about 190 and 407 gsm, said layers are comprised of a polyolefin polymer and wherein said fabric has been lightly bonded over an area of less than 10 percent.

9. The mat of claim 8 wherein said polyolefin is a polypropylene.

10. The abrasion resistant, oil absorbing fabric of claim 1 which is pin bonded.

11. The abrasion resistant, oil absorbing fabric of claim 8 having a layer of coarse microfibers on either side of said fine microfibers.

12. A self-supporting abrasion resistant, oil absorbing mat comprising at least one layer of fine microfibers having an average diameter of at least 10 samples of about 4 microns bonded with a layer of coarse microfibers having an average diameter of at least 10 samples of about 15 microns wherein said fabric has a basis weight between about 322 and 407 gsm, said layers are comprised of a polyolefin polymer and wherein said fabric has been lightly bonded over an area of less than 10 percent.

13. The abrasion resistant, oil absorbing mat of claim 11 having a layer of coarse microfibers on either side of said fine microfibers.

14. The abrasion resistant, oil absorbing mat of claim 1 which is pin bonded.

* * * * *

UNITED STATES PATENT AND TRADEMARK OFFICE
CERTIFICATE OF CORRECTION

PATENT NO. : 5,639,541
DATED : June 17, 1997
INVENTOR(S) : Gabriel H. Adam

It is certified that error appears in the above-identified patent and that said Letters Patent is hereby corrected as shown below:

Column 4, Line 1, "Hoboken N.J." should read -- Hoboken, N.J. --
Column 6, Line 62, "themal" should read -- thermal --

Column 4, Line 44, "damped" should read -- clamped --
Column 5, Line 48, "receiving is thermoplastic" should read -- receiving thermoplastic --

Signed and Sealed this

Thirtieth Day of September, 1997

*Attest:*

BRUCE LEHMAN

*Attesting Officer*    *Commissioner of Patents and Trademarks*